Dec. 4, 1934.  W. L. SCRIBNER  1,982,932
TAPER ROLLER AND RACE ASSEMBLY
Filed Feb. 17, 1934
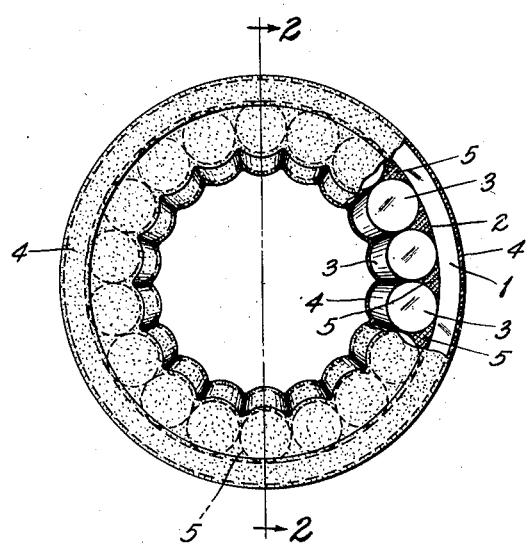
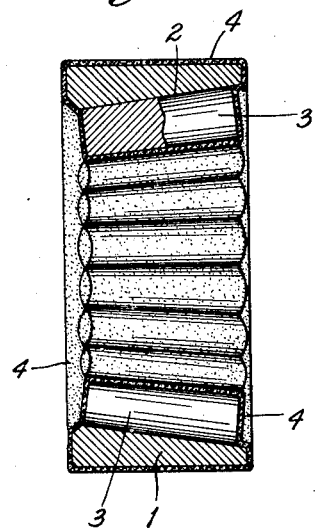
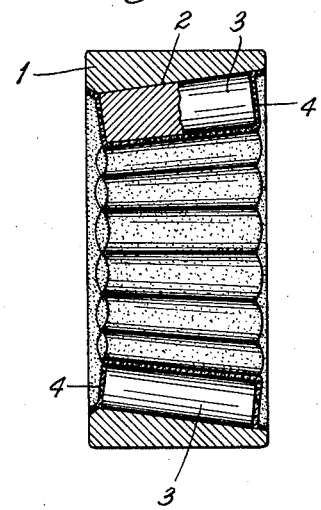
INVENTOR
William L. Scribner,
by Cantlen & Gravely,
HIS ATTORNEYS.

Patented Dec. 4, 1934

1,982,932

UNITED STATES PATENT OFFICE 1,982,932

TAPER ROLLER AND RACE ASSEMBLY

William L. Scribner, Canton, Ohio, assignor to The Timken Roller Bearing Company, Canton, Ohio, a corporation of Ohio Application February 17, 1934, Serial No. 711,628

7 Claims. (Cl. 29—84)

My invention relates to assembling of tapered bearing rollers in a cup or outer race. It is especially applicable to the assembling of said rollers and cup so that they may be transported considerable distances to be applied as a unit to the cone or inner race, which will frequently be formed on a stem or spindle not made by the bearing manufacturer.

It has for its principal object a temporary self-contained assembly ready for mounting on the cone or inner race. Other objects are the elimination of metal cages for the rollers, protection of the rollers against rust and dirt or other foreign matter and provision of the proper number of correctly sized rollers in said cup.

The invention consists in the taper roller and race assembly, in the parts and combinations and arrangements of parts and in the process hereinafter described and claimed.

In the accompanying drawing,

Fig. 1 is an end view,

Fig. 2 is a sectional view of a taper roller and race assembly embodying my invention, and Fig. 3 is a sectional view of a slight modification.

The increasing use of full series, cageless taper roller bearings and of mountings, such as universal joints, wherein the inner race is formed directly on a pin or shaft not made by the bearing manufacturer has created a serious problem in the shipping and installing of the rollers and outer race on the inner race. It is well known that bearing rollers must have a definite fit in the bearing member with which they are assembled, that is, the rollers and said bearing member must be of such relative sizes as to insure proper running clearance of the rollers and to prevent excessive clearance. Some sort of self-contained assembly is needed, since the shipment of loose rollers and bearing members would result in incorrect assembling of the rollers by the user. Metal cages have been devised for making a self-contained assembly of the rollers and the cup, but the increasing use of full series bearings where no cage is needed in the operation of the bearing makes it desirable to dispense with the expense of such cages. The present invention satisfactorily and economically solves the above difficulties.

In the drawing is illustrated a bearing cup 1 or outer race having a conical bore or raceway 2 and a series of taper rollers 3 mounted in said raceway. In the final assembly of the rollers and cup on an inner bearing member, the parts will be adjusted so as to leave the necessary running clearance between rollers, but the drawing shows adjacent rollers in full contact along their sides. This is accomplished by inserting the rollers 3 as far as possible into the tapered bore 2 of said cup.

In Figs. 1 and 2, both ends of the rollers 3, the exposed portions of the periphery thereof, the ends of the cup 1 and the outer periphery of the cup are all coated with paraffin 4 or other hard wax. The paraffin also enters the triangular spaces 5 between adjacent rollers and the cup.

In Fig. 3 the paraffin coating is confined to the rollers and the portions of the bore 2 of the cup inwardly of the ends.

The paraffin coating may be applied in any suitable way, as by dipping the assembled cup and rollers into melted paraffin or other wax, removing the assembly and permitting the paraffin to harden.

The rollers and the cup form a self-contained unit that may be shipped and handled quite roughly without separation of the parts. When the rollers and cup have been assembled on the inner bearing member, the paraffin may be removed by immersing the parts in hot water or hot oil or by applying heat in any suitable manner. Thus the paraffin may be completely removed and not remain as an impurity in the lubricating oil for the bearing.

The above assembly and process have important advantages. A temporary self-contained assembly of taper rollers and the bearing cup is formed at a minimum of expense. The paraffin coating takes the place of the protective coating of heavy grease that is required to be used on bearings prior to their installation, so that only the slightest additional expense is required. The bearing parts are protected against rust, dirt and other foreign matter, the proper grouping of bearing rollers and cup is provided, no metal cage is needed and the bearings are easily assembled.

What I claim is:

1. A taper bearing roller and cup assembly comprising a cup having a conical raceway therein, a multiplicity of taper rollers filling said raceway and a coating of waxlike material holding said rollers and said cup together.

2. A taper bearing roller and cup assembly comprising a cup having a conical raceway therein, a multiplicity of taper rollers filling said raceway and a coating of paraffin holding said rollers and said cup together.

3. A taper bearing roller and cup assembly comprising a cup having a conical raceway therein, a multiplicity of taper rollers filling said raceway, the sides of adjacent rollers contacting with each other, and a coating of waxlike material holding said rollers and said cup together.

4. A taper bearing roller and cup assembly comprising a cup having a conical raceway therein, a multiplicity of taper rollers filling said raceway and a coating of waxlike material on the exposed portions of said rollers and the bore of said cup for holding said rollers and said cup together.

5. The method of assembling taper rollers in a bearing cup comprising placing said rollers in said cup with their edges in contact and coating the exposed portions of said rollers and of the interior of said cup with a waxlike material.

6. The method of assembling taper roller bearings comprising placing taper rollers in a bearing cup with their edges in contact, coating said rollers and the interior of said cup with a waxlike material, mounting the assembled cup and rollers on an inner bearing member and removing said coating by heat.

7. A taper bearing roller and cup assembly comprising a cup having a conical raceway therein, a multiplicity of taper rollers filling said raceway, said rollers being shorter than said cup and being disposed so that said cup projects beyond both ends of said rollers, the sides of adjacent rollers contacting with each other, and a coating of wax like material holding said rollers and said cup together.

WILLIAM L. SCRIBNER.